(12) United States Patent
Mark et al.

(10) Patent No.: US 12,517,502 B2
(45) Date of Patent: Jan. 6, 2026

(54) AUTONOMOUS MEASURING ROBOT SYSTEM

(71) Applicant: HEXAGON TECHNOLOGY CENTER GMBH, Heerbrugg (CH)

(72) Inventors: Simon Mark, Thal (CH); Roman Steffen, Rebstein (CH); Matthias Wieser, Wendlingen (DE); Pascal Jordil, Ecoteaux (CH); Claudio Iseli, Au (CH); Silvan Meile, St. Gallen (CH); Lukas Heinzle, Wädenswil (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 432 days.

(21) Appl. No.: 17/888,276

(22) Filed: Aug. 15, 2022

(65) Prior Publication Data

US 2023/0050932 A1 Feb. 16, 2023

(30) Foreign Application Priority Data

Aug. 16, 2021 (EP) .................................. 21191487

(51) Int. Cl.
*G05B 19/418* (2006.01)
*B25J 9/16* (2006.01)
(Continued)

(52) U.S. Cl.
CPC ...... *G05B 19/41895* (2013.01); *B25J 9/1679* (2013.01); *B25J 9/1697* (2013.01);
(Continued)

(58) Field of Classification Search
CPC . G05B 19/41895; B25J 9/1679; B25J 9/1697; B25J 11/00; G05D 1/0291
(Continued)

(56) References Cited

U.S. PATENT DOCUMENTS

| 7,672,500 B2 | 3/2010 | Albeck et al. | |
|---|---|---|---|
| 2014/0031977 A1* | 1/2014 | Goldenberg | ........... B62D 55/26 |
| | | | 180/9.1 |

(Continued)

FOREIGN PATENT DOCUMENTS

| CN | 109521766 A | 3/2019 |
|---|---|---|
| CN | 113029959 A | 6/2021 |

(Continued)

OTHER PUBLICATIONS

Extended European Search Report in EP application No. 21191487.4 dated Jan. 21, 2022.

*Primary Examiner* — Mohammad Ali
*Assistant Examiner* — Joshua T Sanders
(74) *Attorney, Agent, or Firm* — Maschoff Brennan

(57) ABSTRACT

A system for autonomously measuring workpieces, the system comprising one or more mobile robots, configured to move autonomously in a production environment with a plurality of production facilities that produce a plurality of different workpieces, each of the mobile robots comprising a spatial localization system for deriving a location of the mobile robot in the production environment, an autonomous navigation and propulsion unit configured for providing mobility of the mobile robot in the production environment, a wireless communication interface providing a data link to at least one other mobile robot and/or to computation and storage system, wherein a first mobile robot comprises a sensor setup comprising one or more sensors and is configured to use one or more of the sensors for identifying a workpiece to be measured and for determining an at least rough position of the workpiece that allows collecting or measuring the workpiece.

21 Claims, 10 Drawing Sheets

(51) Int. Cl.
*B25J 11/00* (2006.01)
*G05D 1/00* (2024.01)

(52) U.S. Cl.
CPC .......... *B25J 11/00* (2013.01); *G05D 1/0291* (2013.01); *G05B 2219/39001* (2013.01); *G05B 2219/50393* (2013.01)

(58) Field of Classification Search
USPC ........................................................ 700/113
See application file for complete search history.

(56) References Cited

U.S. PATENT DOCUMENTS

| | | | | |
|---|---|---|---|---|
| 2019/0331701 | A1* | 10/2019 | Polley | G01N 35/0099 |
| 2019/0342499 | A1* | 11/2019 | Xiong | H04N 17/002 |
| 2021/0064015 | A1* | 3/2021 | Mariani | G05B 19/4188 |
| 2021/0232989 | A1* | 7/2021 | Rana | G05B 19/418 |

FOREIGN PATENT DOCUMENTS

| | | | | |
|---|---|---|---|---|
| DE | 195 44 240 | A1 | 6/1996 | |
| EP | 3 579 174 | A1 * | 12/2019 | ....... G05B 19/41895 |
| EP | 3 045 992 | B1 | 10/2020 | |
| EP | 4 095 561 | A1 | 11/2022 | |
| WO | 2019/234249 | A1 | 12/2019 | |
| WO | 2020/126123 | A2 | 6/2020 | |

\* cited by examiner

AUTONOMOUS MEASURING ROBOT SYSTEM

BACKGROUND

The present disclosure pertains to the field of quality assurance for production processes in production environments, such as factories. More specifically, the present disclosure relates to a system comprising one or more mobile robots for measuring, particularly autonomously, samples of the output of a production process in the production environment.

The present disclosure in particular relates to a deployment of intelligent solutions to diverse types of production lines, in particular for the task of smart and adaptive quality control during the production process at a production line in a smart factory environment. The system according to the disclosure can be applied to any type of production line.

It is common practice during the industrial production of a workpiece or product to measure features and properties of its different components. These measurements can be carried out in special measurement cells by means of either contact or non-contact measuring gauges, for example based on laser or photogrammetric principles. Such a procedure, for instance, is disclosed in DE 195 44 240 A1.

For monitoring and quality control of a production, and for deriving statistics, reports and notifications, products are measured with respect to their physical properties, one of the most important properties being the geometry. State-of-the-art industrial solutions may rely on fixed measurement protocols, typically involving static platforms performing measurements at specific, pre-determined stations of the production chain. For instance, this can involve taking samples and checking them by dedicated coordinate measurement machines, either in-line with the production or in dedicated metrology rooms.

U.S. Pat. No. 7,672,500 discloses a method for monitoring and visualizing the output of a production process, whose output materials or items are inspected by one or more inspection units. The inspection units scan or otherwise inspect each of a series of items or material being produced by a production process, and an image is generated representing each of the inspected items, wherein differences between the items can be visually coded. EP 3 045 992 B1 discloses a compensation of errors occurring in a production process.

The quantities produced in the controlled production process can lie in a range between single-piece production and mass production. Each part is produced in a production facility which can incorporate a broad scale of different production techniques and technologies. Depending on the specific production technique the installation setup of the facility can vary. The parts to be produced are specified by nominal data that defines theoretical dimensions of the part—optionally in combination with appropriate tolerances. The tolerances define the accepted deviations between the specified theoretical dimensions of the nominal data and the real dimensions of a produced part.

Such measurements require human interaction for collecting the sample workpieces at the various production facilities, transporting them to the measuring table, measuring the sample workpieces and optionally returning them to the production facilities. This needs specially trained personnel in order to avoid errors in selecting the appropriate samples and accidents when moving through the production environment. Also, some production environments may be harmful or hazardous to human health.

Therefore, it would be desirable to have this collecting and measuring be performed autonomously without the need for human interaction and presence in the production environment. Particularly, it would be desirable that this collecting and measuring could be performed autonomously for workpieces from a multitude of different production facilities present in the production environment.

WO 2019/234249 A1 generally discloses the use of mobile vehicles in a production environment. The disclosed measuring functionalities however are not very accurate or require the presence of stationary coordinate measuring machines in the production environment. Therefore, it would be desirable to have the measuring be performed autonomously with high flexibility and high precision on a measuring table.

SUMMARY

It is therefore an object to provide an improved method and an improved system for controlling production processes of objects in a production facility.

It is a further object to provide such a method and system that require fewer or no involvement of human operators, i.e. work fully or essentially fully autonomously.

It is a further object to provide such a method and system that improve the quality of the output of a production and reduce scrap, e.g. by allowing a faster inspection of the dimensions of produced workpieces and faster corrective actions in response thereto.

It is a further object to provide such a method and system that allow accelerating closing the production loop.

It is a further object to provide such a method and system that can be used with existing production facilities, and without the need for adapting the production facilities.

At least one of these objects is achieved by the system for autonomously measuring workpieces as described herein.

A first aspect relates to a system for autonomously measuring workpieces. The system comprises one or more mobile robots configured to move autonomously in a production environment which comprises a plurality of production facilities producing a plurality of different workpieces. Each of the mobile robots comprises a spatial localization system for deriving a location of the mobile robot in the production environment, an autonomous navigation and propulsion unit configured for providing mobility of the mobile robot in the production environment, and wireless communication interface providing a data link to at least one other mobile robot and/or to a computation and storage system. According to this aspect, a first mobile robot comprises a sensor setup comprising one or more sensors is configured to use one or more of the sensors for autonomously identifying, at each of at least a subset of the production facilities, a workpiece to be measured, and for determining an at least rough position of the workpiece that allows collecting and/or measuring the workpiece. The first mobile robot or a second mobile robot is a measuring robot comprising a measuring arm with a probe for measuring the workpiece on the measurement table and obtaining measurement data about the measured workpiece and a first wireless communication interface configured for providing the obtained measurement data to the computation and storage system.

According to one embodiment of the method, the first mobile robot ("pick-up robot") comprises an end effector, such as a grabbing tool, the end effector being configured for collecting, holding and controlled release of the workpiece. The first mobile robot is configured to collect (pick up) the identified workpiece, to transport the workpiece to a measurement table and to position the workpiece on the measurement table. The first mobile robot or—in the alternative that a second mobile robot is a part of the system—the second mobile robot is configured for measuring the workpiece on the measurement table using the probe.

According to some embodiments of the system, the system comprises the computation and storage system, which is configured for receiving the obtained measurement data. In particular, the computation and storage system is configured as a fog or cloud computation and storage system, for performing cloud analytics, and/or to control at least a subset of the production facilities.

According to another embodiment of the system, the computation and storage system is configured to provide task data to at least the first mobile robot, e.g. continuously and in real time, wherein the task data comprises at least one of the following:
sequence information about a sequence for subsequently approaching the plurality of production facilities by the first mobile robot;
position information about a position of the production facilities and/or a path of the first mobile robot to the next production facility in the sequence;
identification information for a plurality of different workpieces, the identification information allowing the identifying of the workpieces with sensor means of the first mobile robot; and
pose information for a plurality of different workpieces, the identification information being related to a predetermined or required pose of the respective workpiece for being measured, e.g. a required pose of the workpiece when it is being positioned by the first mobile robot on a measurement table.

In one embodiment, the computation and storage system is configured to use the measurement data of one or more measured workpieces to control one or more of the production facilities by the computation and storage system.

In another embodiment, the computation and storage system is configured to use the measurement data of one or more measured workpieces to generate adapted task data comprising computer-readable instructions regarding an adapted task for one or more of the first mobile robots.

According to some embodiments, the system comprises a plurality of first mobile robots ("pick-up robots") and at least one second mobile robot ("measuring robot").

In one embodiment, for allowing movement of the mobile robots in the production environment, a first subset of the mobile robots comprises wheels and a second subset of the mobile robots comprises legs, particularly wherein each subset comprises at least one first mobile robot.

According to some embodiments, the system comprises at least one first mobile robot ("pick-up robot") and at least one second mobile robot ("measuring robot"), wherein the second mobile robot comprises the measuring arm, and, both, the first mobile robot and the second mobile robot each comprise a wireless communication interface configured to provide a data link for exchanging—either directly or via the computation and storage system (or both)—data with each other.

In one embodiment, the second mobile robot comprises the first wireless communication interface In one embodiment, the first mobile robot is configured to send data to the second mobile robot comprising information about an identity of a collected workpiece and/or about a position of a workpiece to be measured on the measurement table.

In one embodiment, the second mobile robot is configured to issue, after measuring the workpiece, a command to the first mobile robot to collect the workpiece from the measurement table.

In one embodiment, the second mobile robot is configured to issue, based on a result of the measurement of the workpiece, a command to the first mobile robot to either transport the workpiece back to the production facility or to a defined storage area.

In one embodiment, the second mobile robot comprises the measurement table, particularly a granite measurement table comprising a granite surface to position the workpiece on.

According to another embodiment of the system, the first mobile robot comprises the measuring arm and the first wireless communication interface. In one embodiment, the first mobile robot also comprises the measurement table, particularly a granite measurement table comprising a granite surface to position the workpiece on.

In one embodiment, the measuring arm comprises an end effector configured for collecting, holding and controlled release of the workpiece, wherein the end effector and the probe are automatically interchangeable (combined operation and measuring arm). In particular,
the measuring arm is embodied as an articulated arm,
the end effector is embodied as a grabbing tool and/or comprises a gripper, a claw, an artificial hand, and/or a magnet, and
the probe is a touch trigger probe or an optical scanning probe.

In another embodiment, the first mobile robot comprises an operation arm—particularly not being the measuring arm—comprising the end effector. In particular,
this operation arm is embodied as an articulated arm,
the end effector is embodied as a grabbing tool and/or comprises a gripper, a claw, an artificial hand, and/or a magnet, and
the sensor setup comprises at least one camera.

According to some embodiments, the first mobile robot is configured to collect the workpiece from the measurement table after the workpiece has been measured, and to transport the workpiece back to the production facility or to a defined storage area, and/or to move the workpiece on the measurement table to change a pose of the workpiece, in particular after the workpiece has been measured partially.

According to some embodiments of the system, the measuring arm is an articulated arm, and the probe is a touch trigger probe or an optical scanning probe. For instance, the arm may comprise more than one probe, e.g. a touch trigger probe and an optical scanning probe, wherein the probes are automatically interchangeable.

A second aspect pertains to a computer-implemented method for controlling a measurement of a plurality of different workpieces produced in a plurality of production facilities in a production environment, e.g. using a system according to the first aspect. The method comprises
generating task data at a computation and storage system and providing the task data to one or more autonomous mobile pick-up robots, the task data comprising computer-readable instructions regarding a task for each of the mobile pick-up robots to subsequently approach the plurality of production facilities, to collect a workpiece at each production facility and to position the workpiece on a measurement table within the production environment;
receiving, from one or more autonomous mobile measuring robots, measurement data of each workpiece; and using the measurement data of one or more measured workpieces to control one or more of the production facilities by the computation and storage system, and to generate adapted task data comprising computer-readable instructions regarding an adapted task for one or more of the mobile pick-up robots.

In one embodiment, the method comprises measuring each workpiece at the measurement table by means of one or more autonomous mobile measuring robots to generate the measurement data and providing the measurement data to the computation and storage system.

A third aspect pertains to a computer programme product comprising programme code which is stored on a machine-readable medium, or being embodied by an electromagnetic wave comprising a programme code segment, and having computer-executable instructions for performing—particularly when executed on a computation and storage system of a system according to the first aspect—the method according to the second aspect.

BRIEF DESCRIPTION OF THE DRAWINGS

The disclosure will be described in detail by referring to exemplary embodiments that are accompanied by figures, in which.

DETAILED DESCRIPTION

Figure 1:
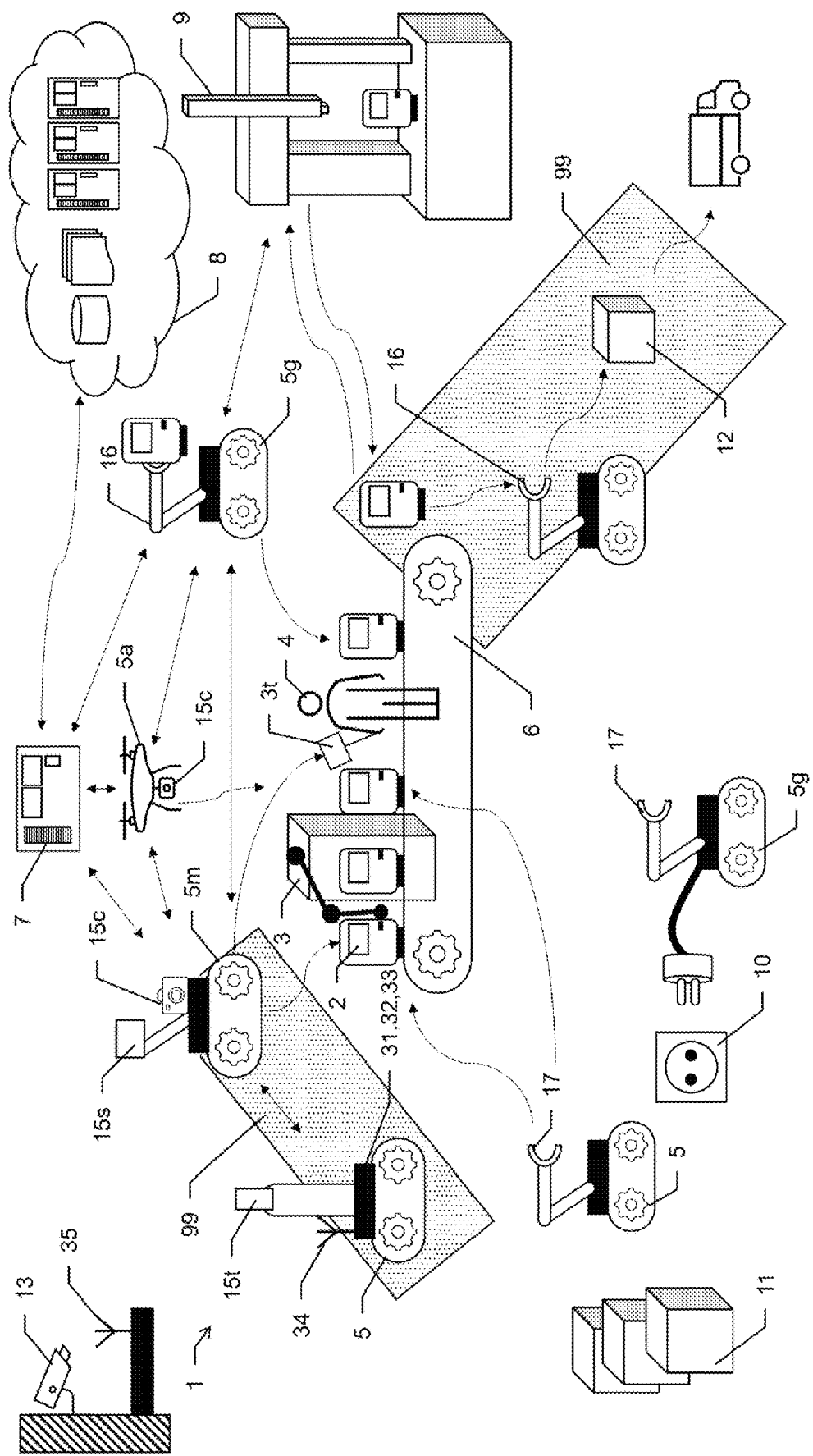
FIG. 1 shows an example of a prior art system.

In FIG. 1, an exemplary production environment 1 with a prior art system of autonomous robots is depicted. Such a system is generally disclosed in WO 2019/234249 A1. Said system may be further improved to be embodied as or comprise a system, e.g. one of the embodiments described with respect to FIGS. 2 to 8.

The exemplary production environment 1 shown in FIG. 1 comprises a conveyor belt 6, on which produced parts 2 (workpieces) are built and assembled in several steps while they move along, either moving substantially stepwise or substantially continuously. Quality control can be performed dynamically at various stations along that production process, either in-line or by taking random samples.

The example shows a production environment, e.g. a factory, where a workpiece 2 is produced. The production environment comprises a conveyor belt 6, along which the workpiece 2 is moved in-between different production processes or steps. For example, computer systems, cars, various electronic and/or mechanical equipment, or parts or subunits thereof can be produced in such a dynamic scenario. The produced workpiece 2 can be a single, specific and fixedly defined item, but can in particular also be dynamically changed, varied, adapted or configured to produce different variants of the workpieces 2 or a variety of totally different workpieces ("lot size of one"). Steps of the production processes can be accomplished by one or more machines 3, by human workers 4, smart handheld tools 3t, smart devices like tablet computers or by a combination of those. The production environment 1 also comprises multiple mobile vehicles 5, which are preferably configured to move autonomously or freely in the production environment 1. Such mobile vehicles 5 therefore comprise a propulsion or drive unit, e.g. with an electric motor, a motor controller and a battery, as well as a spatial locating system for deriving a location of the mobile vehicle 5 in the production environment, e.g. with a Lidar, an (indoor) GNSS sensor, radio navigation, visual navigation, cameras, SLAM, SFM, IMU, guide marks, special sensors, etc., and a navigation and drive unit configured to manoeuvre the vehicle through the production environment 1 in a preferably autonomous manner, e.g. by a computation system on the mobile vehicle which is configured to do so. This deriving of a location of the mobile vehicle 5 in the production environment for the autonomous navigation can therein be established with a low accuracy, e.g. of some centimetres or decimetres, in particular a relatively low accuracy compared to the accuracy required for a positioning in a production step of a production. Therefore, the autonomous navigation for the movement of the mobile vehicle in its environment can rely on different location sensors than the sensors used for the positioning and/or referencing for the execution of a production task—or if the same sensors are used they can be evaluated by another algorithm and/or with a lower accuracy, which can in general be done faster.

For example, an image captured by a camera 15c at the mobile vehicle 5m can be evaluated by a less accurate SLAM or collision avoidance algorithm (or unit) during the autonomous navigation when moving around in the production environment 1, while an image form the same camera 15c can be evaluated by a more accurate reference mark detection and/or surveying algorithms (or units) when the mobile vehicle 5 accurately positions or references itself with respect to a workpiece 2 or a machine 3 for the execution of a specific task. An image evaluation by the less accurate SLAM or collision avoidance algorithm can therein comprise a spatial localisation of the mobile vehicle 5m in its environment in an order of magnitude of centimetres or more, in particular with respect to obstacles, e.g. for establishing an autonomous navigation of the mobile vehicle and to avoid collisions. In contrast thereto, an image evaluation by the more accurate reference mark detection and/or surveying algorithm can comprise a spatial registration and/or referencing with increased reliability and precision compared to the SLAM or collision avoidance algorithm, by which an exact spatial reference with respect to the workpiece and/or another mobile vehicle or stationary factory equipment is established, e.g. in an order of magnitude of millimetres or below one millimetre. Dependent on an actual operation to be performed by the mobile vehicle, the edge computation unit at the vehicle can autonomously select one or both of such evaluations, in particular also based on the same image from the same camera. In particular, a certain algorithm for the accurate positioning or referencing with respect to a workpiece 2 or a machine 3 can be orchestrated and/or deployed to the mobile vehicle on demand, in conformance with respect to the task to be executed by the mobile vehicle 5. But it can also be embodied vice versa, wherein an edge intelligence system at the mobile vehicle 5*m* automatically requests a suitable algorithm for a spatial referencing with respect to a certain machine 3 or workpiece 2, based on the task that the mobile vehicle 5*m* is confronted with, e.g. in form of a microservice for establishing a docking manoeuvre. Such a deployed microservice may be specifically pre-configured or pre-conditioned—e.g. in the cloud—specifically for those mobile vehicles 5, machines 3 and/or workpieces 2 which participate in the specific task. In an artificial-intelligence approach, such can e.g. involve a transfer learning approach, in which a deployed microservice for a task comprises a generic machine learned approach for establishing this task which is then specifically supplemented or fine-configured by one or more machine learned specifics for the presently participating mobile vehicle 5,5*g*,5*m*,5*a*, machine 3 and/or workpiece 2. For example, by transfer learning, a generalized docking manoeuvre provided by an edge client at the machine to be docked at can be combined to a knowledge at the edge client of the mobile vehicle 5 about its sensors and their capability and specifics in order to automatically derive a most appropriate docking manoeuvre algorithm for this specific instance of docking.

This can comprise a transfer learning between the edge-computation systems at the mobile platforms, but also in combination with higher-level computation systems. For instance, a measurement unit is configured for quality inspection and its task is to detect and classify various defect types. The unit somehow detects an anomaly, e.g. a deviation from previously built and inspected items, or a deviation in between "as measured" and "as designed" e.g. leveraging construction and design data from a 3D model, but cannot match it to any of the defect types it knows, e.g. it cannot classify the anomaly with reasonable confidence into one of the previously machine learned classes which are available to this measurement unit. For example, a local spatial reference cell can somehow not be established as supposed in view of the corresponding virtual model, e.g. as there are ambiguities or contradictions in the measurement data. In such a scenario, the edge-analytics unit at the unit can query information from other entities, (like all other mobile platforms with a similar measurement unit or task, or the archived data lake in the cloud, etc.) whether those have encountered a similar "sample" with such an anomaly before and/or if those have already learned a classification for it. The system or the edge-analytics unit can also provide its sample to a highly specialized cloud machine learning (ML) unit which can process the sample with more advanced and resource intense ML-algorithms like deep-learning approaches. The learned knowledge from such another entity can then be shared and the local model at the edge-computation system of the measurement unit can then be updated based on this information. Even new, previously untrained classes of anomalies can be detected, clustered and classified automatically by such a system, e.g. if several platforms individually detect previously unseen defect types, they can cross-check whether those detected defects comprise significant similarities. Such unseen defect types can optionally also be reported to an operator via a dashboard analytics system to request human feedback to verify this and maybe provide a new classification and/or corresponding measures to be taken.

The transfer learning approach from above can not only be applied at an edge analytic engine of a single unit, class of vehicles or factory, but also across different factories and/or locations, e.g. through a cloud instance. The transfer learning is also not limited to a single specific product, but can be applied across different types of produced products. For instance, a robust quality inspection model A can be learned for product A. For the production of new product B, the same model A can be re-trained and/or fine-tuned on fewer examples than needed when starting from scratch for a model B. This not only results in accelerating deployment on the production line, but provides a more efficient usage of resources and digital storage.

As an example for another application of transfer learning in an application different from quality inspection, a collision avoidance system of the autonomous navigation systems of the mobile platforms can benefit from transfer learning of the experiences of any other member of the fleet. For instance, one platform encounters a previously unseen type of obstacle, and possibly bumps into it—the autonomous navigation unit is trained to avoid such in the futures, e.g. by a reinforcement learning. The representation of this obstacle (e.g. visual, depth etc.) and the result of the reinforcement learning not to bump into it, can then not only be used locally by this specific platform, but can be used to update a generalized "obstacle model" using transfer learning, which can then be shared with other platforms, e.g. also with different platforms like UAVs, etc.

FIG. 1 gives an overview of the field, which leverages an orchestrated combination of smart mobile vehicles 5, at least one of which configured as a smart mobile measurement vehicle 5*m*. The smart mobile vehicles 5 are configured to be able to communicate with each other and are endowed with an elevated level of autonomy, which is derived from advanced analytical capabilities at the edge and in the cloud. The communication can be wired as well as wireless and can comprise a plurality of wireless access points 35, which can optionally also be used to provide spatial references for the autonomous navigation of the vehicles. The term "edge" refers to computing infrastructure which exists close to the origin sources of data, in the present case on the mobile vehicle. Such can for example be embodied in form of a distributed IT architecture and infrastructure, in which data processing takes place at the periphery of the network, preferably as close as possible to the originating source. By such an edge-computing approach, an optimization of the efficiency of a cloud computing system can be implemented, as the data processing occurs at the edge of the network, near the source of the data. Cloud computing refers to an approach, where the computing and storage is externalized and/or virtualized over a network link to a data center, which can also be located remotely from the actual data source, e.g. anywhere in the internet. An edge-computing approach can avoid restrictions and potential points of failure, as a dependency on a single core computing system is omitted and also increases scalability and allows alignment of computational power at the actual location where it is needed and avoids excessive real-time data transmission. Not only that time sensitive data can be processed locally at the edge to avoid latencies, also the data volume which has to be transmitted over the network is reduced, as the pre-processing is performed at the edge.

Thereby, the cloud servers only have to process and store data which is not highly time critical. For example, the cloud functions can be focused on dashboards function, analytics and ERP systems. A device relationship management (DRM) may be provided which manages a plurality of edge devices, in particular in form of an enterprise software for monitoring, maintenance, managing and servicing complex, intelligent, and interconnected edge-equipment in a factory network.

Such an edge-computation system can also comprise intermediary computer systems, e.g. at the edge of a station of a production line, of a production line or of a factory, which processes data in close proximity to the corresponding data source. This is also referenced as fog computing or IoT gateway, providing so to say a kind of a bridge between the edge and the cloud computing.

The mobile vehicles or mobile platform can also be referred to as collaborative robots ("cobots"). Mobile vehicles which are equipped with measurement units for quality control can in particular be referred to as mobile inspection cobots. Mobile vehicles which are equipped with laser tracker units for accurate spatial measurements can in particular be referred to as mobile reference-cell cobots.

The mobile vehicles 5 can be customizable in their programming to accomplish one or more different tasks in the worksite environment. For example, for different workpieces, different tasks on a workpiece or at different locations in the production environment, different configurations or software modules can be flexibly loaded by the mobile vehicle or by its components according to the specific task the vehicle has to fulfil. Such orchestration and assignment of a specific task at a specific time to a specific vehicle can therein be done flexibly according to an availability and the capabilities of the mobile vehicle, wherein much of the therefore required computational intelligence and information can be provided at the edge, which means at the mobile vehicle 5. Upper level tasks can be tasks like supplying parts, machining, mounting, handling, assisting, quality assurance, moving items, moving workpieces, moving workers, painting, gluing, documentation, etc., respectively the according capabilities for fulfilling one of those tasks at the mobile vehicle 5. According to their tasks the mobile vehicles can be equipped with one or more measurement tools, actuator tools and/or machining tools, either fixedly or in an exchangeable manner. The lower level task can then comprise the detailed information on how to execute the upper level task at a specific workpiece for a specific step in the production and measuring chain, e.g. where, in which order and how:

complementary or additional measurements have to be carried out,
screws have to be tightened at a workpiece,
along which path glue has to be applied in which quantity, how and along which geometry to mate which subcomponents of the work-piece, etc.

The system can also automatically keep clear a certain working area in the production environment which area is required for the current task. For example, if there are obstructions or obstacles in form of persons, particularly staff, these persons can be sent a notification to leave the working area. If the obstructions are equipment or other object assigned to a particular person, this person can be sent a notification to remove the object from the area. The notification can be sent to a mobile device assigned to the person, e. g. a smartphone or other personal device—for example an augmented reality, virtual reality or mixed reality view can be provided to the person, in which areas to keep clear are visually marked and an acoustic and or haptic warning can be issued if such an area is approached or entered. If there is an obstruction in form of a mobile vehicle, this mobile vehicle can be provided with an instruction to move out of the working area. The system can e.g. dynamically define a virtually keep-out zone 99 in the production environment, in particular specific for the current task to be established and/or for the temporary for the duration of the current task.

The mobile device also can be a device especially designed for use with the workflow deployment system and for the purpose of receiving these notifications. It can be equipped with a spatial localization system and can transmit its position to the smart production system. The notification may further comprise information about extent of the measurement area that is to be kept clear and information about an expected duration of the measurement. The notification can be transmitted directly in-between the involved devices and vehicles and/or to a factory management system which generates and provides a virtual fence around the working area and automatically deploys this fence to the relevant participants. The system can also comprise a geo-fencing agent at the edge computation units which is configured to keep track such keep-out zones 99 in the production environment and to interact with an autonomous navigation unit to avoid a violation of those zones 99. In particular, a notification about a keep-out zone 99 can be broadcasted locally in a small range around each of the keep-out zone 99 and the autonomous navigation unit of the mobile vehicles can be configured to handle those zones 99 as virtual obstacles.

Besides strict production tasks, there are also peripheral tasks which can be established by the mobile vehicles, like e.g. stock handling 11, managing and organizing stock supply, distributing stock supply, quality checks, taking random samples, bringing random samples back into the production process, processing random samples at remote test facilities 9, end control, packaging 12, loading, shipping, delivery 12, etc.—either locally at the production environment or at/to remote locations. Other peripheral tasks are also the maintenance of tools and of the mobile vehicles, charging 10 of the mobile vehicles, etc.

An electronic controller at the mobile vehicle 5, e.g. comprising a computation unit and a communication interface is therein configured to establish a bidirectional data link (indicated by double arrows) to the factory environment, in particular to other mobile vehicles 5, to stationary production equipment 3 or 9, to a stationary network access point 7 and/or to a higher-level production control and management system 7 and/or to a cloud computing environment 8. Such higher-level systems can e.g. be configured for overall orchestration, optimization, path planning, global resource allocation, etc. The electronic controller may be embodied as a so-called edge-device, which brings computation power and intelligence to the source of the data, whereby the factory system is decentralized. One example of such step in the direction of decentralisation can e.g. be an autonomous movement of the vehicle, which can involve providing the vehicle with a desired destination to move to, but not necessarily with details of a defined path to follow. The path and the navigation along the path can be determined autonomously by the edge-intelligence of the controller at the mobile vehicle. Doing so can be assisted by various meta-data information, e.g. a desired destination time, a priority level, etc. The mobile vehicle can be configured to be aware of many of such meta information on its own. For example, the mobile vehicle can be "aware"—which means comprise and/or access information—of its technical capabilities, its equipment, its location, its actual state, its payload, its actual and/or further task, its service intervals, but also of boundary conditions in its surroundings (e.g. conflicting trajectories, steep paths or stairs, and the like) etc. The mobile vehicles can be configured to prepare, compute and provide such information at the edge, which means locally at the vehicle respectively at the technical subsystems or units at the mobile vehicle 5. This edge information will then be utilized by other mobile vehicles 5, machinery 3 and/or the control system 7, wherein the mobile vehicles 5 are configured to have autonomy.

In addition to the autonomous ground vehicles (AGV) 5g, also airborne mobile vehicles 5a like unmanned aerial vehicles (UAV) or drones can be comprised in such a system. For example, such UAVs 5a can fly around the factory and make quick checks with limited sensors and sending a more specialised mobile vehicle 5g or cobot, if some potential problem is detected. UAVs can also be used to quickly supply smaller amounts of parts which are running out, replacement parts for tools, production equipment or production parts, etc.

There can be a communication between an UAV and an UGV. The UAV can also be combined with the UGV, using the UGV as a mobile base for the UAV, which can e.g. also provide resources for re-charging, exchangeable equipment, a spatial reference, etc. In an example of a scenario, the UAV can be sent to a specific location by the UGV for conducting a first rough defect inspection by sensors mounted on the UAV, e.g. by a camera. Based on the outcome of a defect analysis based on the images of the UAV-sensor data, e.g. by image processing and identification applied to images from the camera, potential problems can be identified, for example, by using machine learning and advanced analytics. Then, another UAV, UGV or a human supervisor, which is equipped with more appropriate sensors and/or actuators can be ordered to be deployed for a more accurate and detailed evaluation or for a corrective action.

A vital aspect in many of such tasks is to establish a spatial reference of the participants which are involved in this task, like one or more workpieces, one or more work tools, a conveyor belt, a parts supply unit, etc.

By the freely movable mobile measurement vehicles 5m, quality assurance steps can be established substantially anywhere along the conveyor belt, in flexible manner and on actual demand. For example, a quality checking mobile vehicle can be ordered by another static or mobile production entity in the production process, in particular in case of an error, problem or ambiguity that perchance arises during the production. This quality checking vehicle can e.g. be equipped with cameras and sensors specifically designed for one or more of such quality checks. There can be some generalized quality checking vehicles which are configured to do many checks, but not all of them with a precision and reliability that is high enough to clearly identify each and every problem, while there can also be some highly specialized quality checking vehicles which are not as general but highly accurate in a specific discipline. For example, a generalized mobile vehicle can comprise cameras and/or a laser scanner, whereas a specialized mobile vehicle can e.g. comprise a movable CMM machine, an articulated arm or a total station. As those vehicles are mobile, a quality check can be done at various stages of the production process, whereby a smart factory environment can be established which e.g. also brings the advantage that not all of the production stages, production equipment and mobile vehicles have to be per se or precautionary be equipped with lots of sensors, quality check equipment, measurement tools—together with all the according computational intelligence and access to the therefore relevant production data—all of which requires maintenance, updates, etc. A mobile vehicle for quality insurance can be ordered in case of a problem to any location at the worksite environment, in particular in case of an unknown problem with an automatic delegation in which first a generalized vehicle (like a camera inspection UAV) is deployed with the task of identifying the problem, which generalized vehicle can then automatically delegate or re-assign the task (or a task that is further specified according to the findings of the generalized vehicle, or a sub-part of the task) to specialized mobile vehicle for identifying details and/or for resolving the issue. At least part of the involved computing is therein established at the edge, which means at the mobile device.

For quality inspection there can be an analysis of deviations "as planned" vs. "as built" and thereof actions can automatically be triggered by the computation units at the smart factory environment. On a measurement and/or analysis side, such an action can comprise for example a collection of more real-world data by a measurement functionality of one of the mobile vehicles, by which e.g. a refinement of the analysis can be established. On a production side, such action can comprise for example an adjustment of production parameters, like slowing down the machines to decrease failure rate, exchange of worn tools, re-adjustments of the machine, adaption of the production equipment, etc. In unclear situation, the action can also comprise the involvement of a human, e.g. providing the acquired data to a human who takes a final decision, sending out a service engineer to the on-site location, etc. By the presently promoted dynamically re-configurable edge client architecture, in particular combined with a data integration software such as "EdgeFrontier" of Intergraph Corporation, not only a high-level, dashboard-type data can be provided for such human analytics, but in case of necessity, also in-depth, low level analysis data from the factory floor can be derived, substantially in real time. For example, by such an on-demand deployment of according agent modules, services and/or micro services to the edge computing units in the field, in depth insight is given when needed but computation effort and data-volume is not bloated during regular operation.

Such an involvement of a human can e.g. also comprise a deep reinforcement learning from human preferences, in order to refine the automated decision evaluation by the computation entities in the smart factory network. Such human decisions can also be used as role models to be applied to other instances of similar problems by transfer learning.

The system is configured to re-arrange itself to the dynamically changing needs. For example, comprising an automatic selecting of the best sensor-AGV for the task evaluating a set of pre-defined key performance indicators like
- minimize cost (e.g. operations, production, maintenance);
- fulfil minimal measurement accuracy requirements;
- achieve maximum throughput of the production;
- minimize tool wear; or
- equal distribution of jobs across the whole set of available measurement units.

The present disclosure can in particular be embodied in the context of cyber-physical systems, smart factories, or "Industry 4.0", which aim at fostering the computerization of production, in particular comprising systems with multiple intelligent entities at workshop level which are configured to communicate and cooperate with each other and with human workers, e.g. over the Internet of Things.

The system can comprise an integration and communication over the Internet of Things, like sending data from mobile platforms like the mobile vehicles to a command centre 7 for cloud analytics. Based on the resources needed, computationally expensive tasks can thereby be carried out in the cloud 8, which can have availability of larger memory, CPU & GPU clusters, etc. which is not locally available at the edge on the mobile platforms, while other analytics tasks with lower computational effort and/or real time requirements could still be performed at the edge. The disclosure can also comprise sending workflows from cloud and in-between mobile platforms. Workflows can be sent from the command centre to any mobile platform in the fleet. By utilizing their self-defining properties, multiple of the mobile platforms can also communicate directly with each other, without making a detour over the command centre 7 or cloud analytics 8. For example, the mobile vehicles can establish a direct and fast engagement when needed by directly sending workflows to each other. Appropriate workflows can be programmed, reached or derived from the output of machine learning and advanced analytics algorithms, at the edge and/or in the cloud 8.

As an example, an increase in the production volume or throughput will cause the system to decrease the number or quality of quality control while still matching the minimum quality control. But a decrease in the production throughput can optionally trigger an enhanced (time-consuming) quality control and maintenance routines to be scheduled or done earlier than necessary. A decrease in production throughput can for example also trigger extensive data collection for machine learning purposes by utilizing the surplus available capacity, time and resources.

Figure 2:
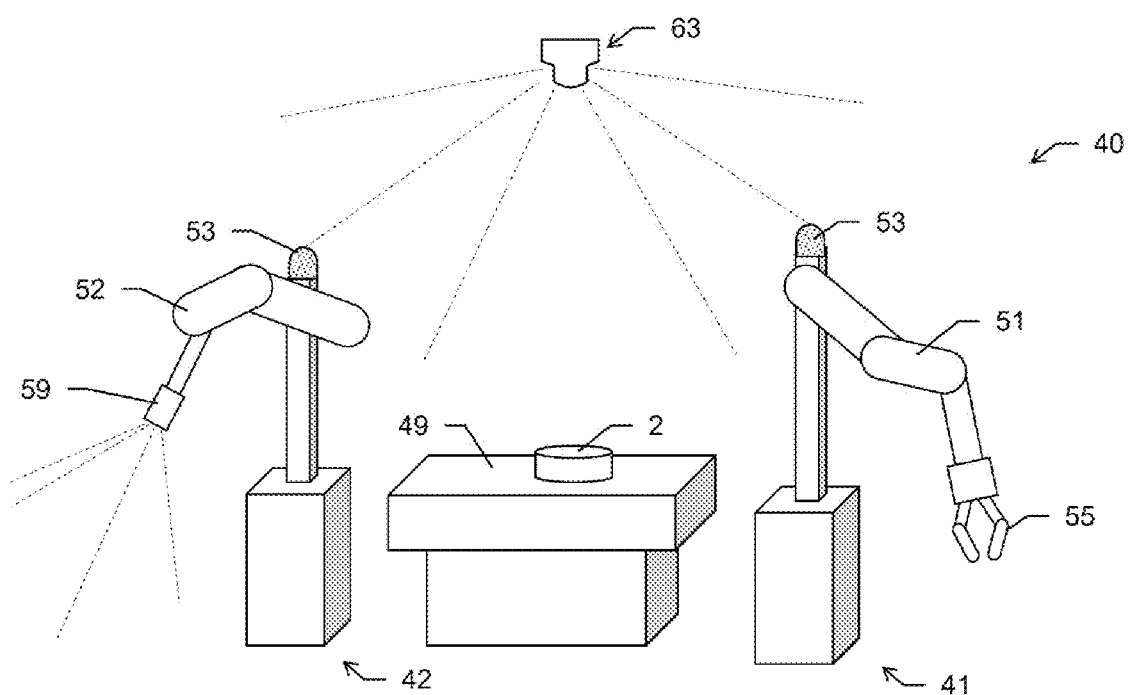
FIG. 2 shows a first exemplary embodiment of a system, comprising a measuring robot and a pick-up robot.

FIG. 2 shows a first exemplary embodiment of a system for autonomously measuring workpieces. The system comprises a first mobile robot 41 and a second mobile robot 42. The first robot 41 is configured as a pick-up robot for collecting a workpiece 2 at a production facility (not shown here) and to transport it to a measurement table 49. For this task, the pick-up robot 41 comprises an operation arm 51, for instance embodied as an articulated arm, with an end effector that is embodied as a grabbing tool 55, e.g. comprising a gripper, claw, artificial hand, or magnet, configured for collecting, holding (during transport) and controlled release of the workpiece 2. The pick-up robot 41 also comprises a sensor setup, e.g. comprising a camera, for identifying the workpiece 2 and its exact position in order to collect it at the production facility and to release it at the measurement table 49. The sensor setup may comprise, e.g., a 3D camera, ToF camera, pattern projector, infrared sensor, proximity sensor, barcode reader and/or RFID reader. For instance, the necessary information to identify the workpiece 2 with the respective sensor means may be retrieved from a database stored in a data storage of the pick-up robot 41. Also information about how to position the workpiece on the measurement table 49 may be provided in the data storage, e.g. if the workpiece 2 needs to be positioned in a certain way so that all relevant features of the workpiece 2 can be reached during the measurement.

The second robot 42 is configured as a measuring robot for measuring the workpiece 2 at the measurement table 49. For this task, the measuring robot 42 comprises a measuring arm 52, for instance embodied as an articulated arm, with a probe 59, e.g. a touch trigger or optical scanning probe, for determining 3D coordinates of the workpiece 2 while it lies on the surface of the measurement table 49. The measurement table 49 particularly is embodied as a granite measurement table, i.e. having a granite surface on which the workpiece 2 to be measured is positioned.

Both mobile robots 41, 42 comprise an autonomous navigation and propulsion unit for providing mobility of the robot in the production environment. In the shown embodiment, the mobile robots 41, 42 comprise wheels in connection with the propulsion unit for providing mobility. Both mobile robots 41, 42 comprise a positioning module 53 that allows determining their positions in the production environment continuously and in real time, e.g. in collaboration or communication with a grid of position scanners 63 provided in the production environment. Suitable position scanning systems for detecting the robots' positions (reality capture devices) are disclosed, for instance, in WO 2020/126123 A2 and EP21176387.5. A communication interface of each mobile robot 41, 42 (not shown here) provides a data link to at least the other mobile robot 41, 42 and/or to a computation and storage system, e.g. a fog or cloud computation and storage system configured for cloud analytics as described with respect to the system of FIG. 1.

Whereas a precision of the first robot's arm 51 need only be in the range of millimetres, the measuring arm 52 of the second robot 42 has to be precise enough to measure the workpiece 2 on the table 49 with the required accuracy, which may be in the submillimetre range depending on the kind of workpiece 2. Optionally, the measuring robot can have additional feet that may be extractable before each measurement to provide a more stable and stationary position—absolutely and/or in relation to the measurement table 45—while performing the measurement.

The first and second mobile robots 41, 42 may have a direct or indirect (e.g. via the computation and storage system) data connection with each other. Thus, for instance, the pick-up robot 41 may notify the measuring robot 42 that a workpiece 2 has been placed on a measurement table 49 and is ready for being measured, and what kind of workpiece 2 will be measured. Also, the measuring robot 42 may notify a pick-up robot 41 that a measurement has been completed, so that the workpiece 2 can be collected at the measurement table 49. Optionally, the measuring robot 42 may notify a pick-up robot 41 that the workpiece 2 needs to be moved, e.g. flipped over, in order to continue the measurement of previously obstructed features.

Also—if the workpiece 2 meets the predetermined requirements—the pick-up robot 41 can receive an instruction from the measuring robot 42 to return the workpiece 2 to the production facility from which it has been taken or to a defined destination within the production environment. If the measured workpiece 2 does not meet the predetermined requirements, the pick-up robot 41 can receive an instruction from the measuring robot 42 to bring it to a quarantine store or to discard it. Also, further actions can be taken if the measurement by the measuring robot 42 reveals that the workpiece 2 does not meet the predetermined requirements, e.g. the respective production facility can be stopped automatically and a human supervisor can be notified.

Figure 3:
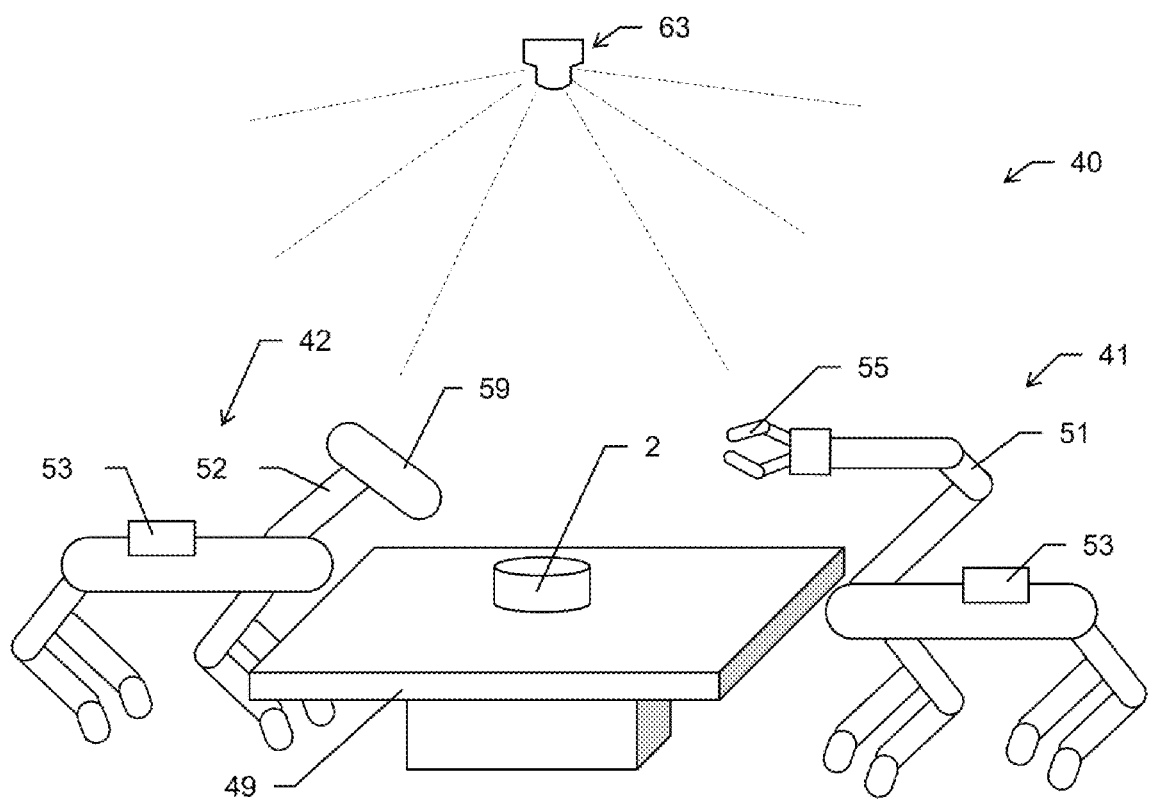
FIG. 3 shows a second exemplary embodiment of a comprising a measuring robot and a pick-up robot.

FIG. 3 shows a second exemplary embodiment of a system for autonomously measuring workpieces. Similar to the system of the first embodiment, this system comprises a first mobile robot 41 and a second mobile robot 42.

Again, the first robot 41 is a pick-up robot for collecting a workpiece 2 at the production facility and to transport it to the measurement table 49. For this task, the pick-up robot 41 comprises an articulated arm 51 (operation arm) with a grabbing tool 55, configured for collecting, holding and controlled release of the workpiece 2. The second robot 42 is configured as a measuring robot for measuring the workpiece 2 at the measurement table 49. For this task, the measuring robot 42 comprises an articulated measuring arm 52 with a probe 59—in this example an optical scanning probe—or determining 3D coordinates of the workpiece 2 on the measurement table 49. Basically, the robots 41, 42 of the second embodiment depicted here, may comprise the same features as those of the first embodiment. Specifically, both mobile robots 41, 42 comprise a positioning module 53 that allows determining their positions in the production environment continuously and in real time using a grid of position scanners 63 provided in the production environment.

In contrast to the first embodiment, the robots 41, 42 of the second embodiment comprise legs instead of wheels for moving around the production environment. Legs have the advantage that small obstacles (e.g. cables, hoses) or uneven ground (e.g. grating, steps) can be passed more easily than with wheels. This may reduce the travel time for the robots and allow use in untidy environments or on rough or irregular surfaces. Although only four-legged robots 41, 42 are depicted here, of course also robots with a different number of legs, e.g. two legs or more than four legs, are possible.

Also combinations of legged and wheeled robots are possible. For instance, if there are no obstacles or uneven ground in a measurement area around one or more measurement tables 49, but there are obstacles in a manufacturing area around one or more production facilities, the measuring robot 42 can be wheeled, and the pick-up robot 41 (or at least a subset of a plurality of pick-up robots 41) can have legs to overcome the obstacles. Alternatively, one or more of the robots, especially of the pick-up robots 41, may be embodied as a UAV.

Figure 4:
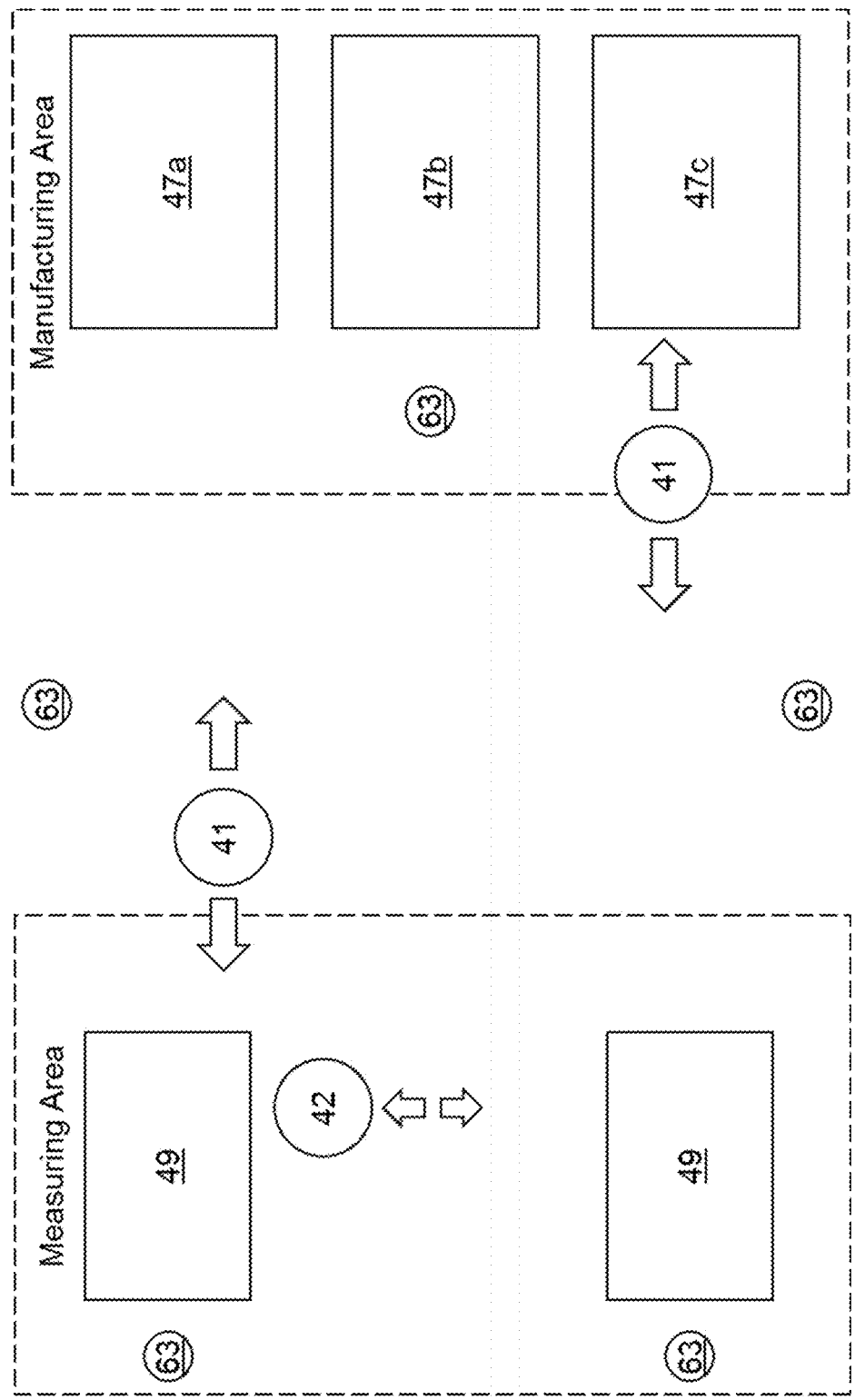
FIG. 4 shows a production environment comprising the first or second embodiment of a system.

FIG. 4 illustrates the use of the systems according to the first and second embodiments in a production environment comprising a measuring area with two measurement tables 49 and a manufacturing area with three production facilities 47a, 47b, 47c, i.e. three machines producing different kinds of workpieces. The system comprises two pick-up robots 41 that move around the production environment between the measuring area and the manufacturing area. They are configured to approach the production facilities 47a, 47b, 47c, to identify and collect a certain workpiece from the respective facility, to bring it to the measuring area and position it on a free measurement table 49. The system also comprises one measuring robot 42 that is positioned in the measuring area and moves between the two measurement tables 49 for measuring the workpieces positioned on the measurement tables.

A 3D surveillance system comprising a grid of position scanners 63 is provided in the production environment, e.g. mounted under a ceiling of the factory. These scanners can be, for instance, Leica Geosystem's "BLK 247".

The robots 41, 42 may communicate with each other via a communication interface and a data link—either directly or via a central communication system. This way, the pick-up robots 41 may communicate with the measuring robot 42, for instance providing information about on which measurement table 49 which workpiece 2 has been positioned. The pick-up robots 41 may receive their tasks—i.e. from which of the production facilities 47a, 47b, 47c to collect what kind of workpiece next—continuously and in real time from a central computation and storage system. Alternatively, they have stored a predetermined routine for a complete measurement cycle, i.e. a fixed sequence for subsequently collecting and measuring workpieces from all production facilities 47a-c. Alternatively, the pick-up robots 41 choose the next production facility 47a-c to approach completely autonomously, for instance randomly or pseudorandomly, or based on feedback or measurement data received from the measuring robots 42 and using artificial intelligence.

Figure 5:
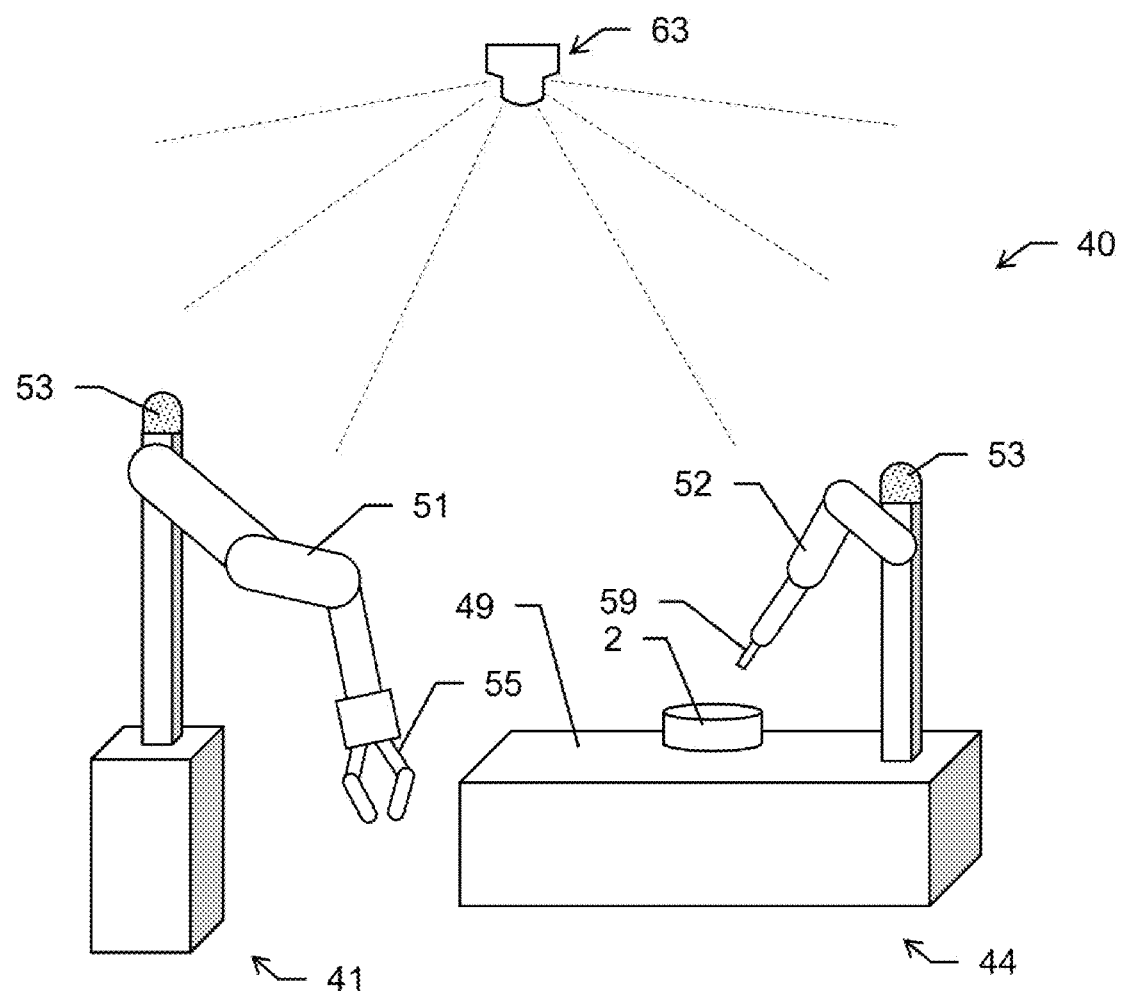
FIG. 5 shows a third exemplary embodiment of a system, comprising a measuring robot with an integrated measurement table and a pick-up robot.

FIG. 5 shows a third exemplary embodiment of a system for autonomously measuring workpieces. The system comprises a first mobile robot 41 and a second mobile robot 44. In contrast to the first and second embodiments, the second mobile robot 44 comprises the measurement table 49. Thus, the measurement table 49 itself is also mobile, and no fixed measuring area is necessary.

The first robot 41 is configured as a pick-up robot for collecting a workpiece 2 at a production facility (not shown here) and to transport it to the second robot 44 and position it on the second robot's measurement table 49. For this task, the pick-up robot 41 comprises an arm 51, for instance embodied as an articulated arm, with a grabbing tool 55, e.g. comprising a gripper, claw, artificial hand, or magnet, configured for collecting, holding and controlled release of the workpiece 2. The pick-up robot also comprises a sensor setup, e.g. comprising a camera, for identifying the workpiece 2 and its exact position in order to collect it at the production facility and to release it at the measurement table 49.

The second robot 44 is configured as a measuring robot for measuring the workpiece 2 at the integrated measurement table 49. For this task, the measuring robot 44 comprises a measuring arm 52, for instance embodied as an articulated arm, with a probe 59, e.g. a touch trigger or optical scanning probe, for determining 3D coordinates of the workpiece 2 while it lies on the surface of the measurement table 49. The measurement table 49 particularly is embodied as a granite measurement table with a granite surface.

Both mobile robots 41, 44 comprise a positioning module 53 that allows determining their positions in the production environment continuously and in real time, e.g. in collaboration or communication with a grid of position scanners 63 provided in the production environment. Both mobile robots 41, 44 comprise an autonomous navigation and propulsion unit for providing mobility of the mobile robot in the production environment. In the shown embodiment, the mobile robots 41, 44 comprise wheels in connection with the propulsion unit for providing mobility. A communication interface of each mobile robots 41, 44 (not shown here) provides a data link to at least the other mobile robot 41, 44 and/or to a fog or cloud computation and storage system configured for cloud analytics.

The mobile measuring robot 44 may follow the pick-up robot 41 through the production environment without approaching the production facilities, thus advantageously keeping the travelling distances for the pick-up robot 41 short. Depending on the layout of the factory, this solution may reduce the time and overall energy that are necessary for performing a complete measurement cycle, i.e. measuring a workpiece from each production facility in the production environment. The measuring robot 44, due to the integrated measurement table 49, may have an inferior manoeuvrability in relation to the smaller pick-up robot 41, and thus may not be able to travel along the same paths as the pick-up robot 41. Also, for performing the measurements, the measuring robot 44 preferably stops its movement around the production environment, to enhance the accuracy of the measured coordinates. Thus, the pick-up robot 41 and the measuring robot 44 not necessarily travel along the same paths. Instead, they only need to meet for positioning workpieces on the measurement table and for removing them again.

Figure 6:
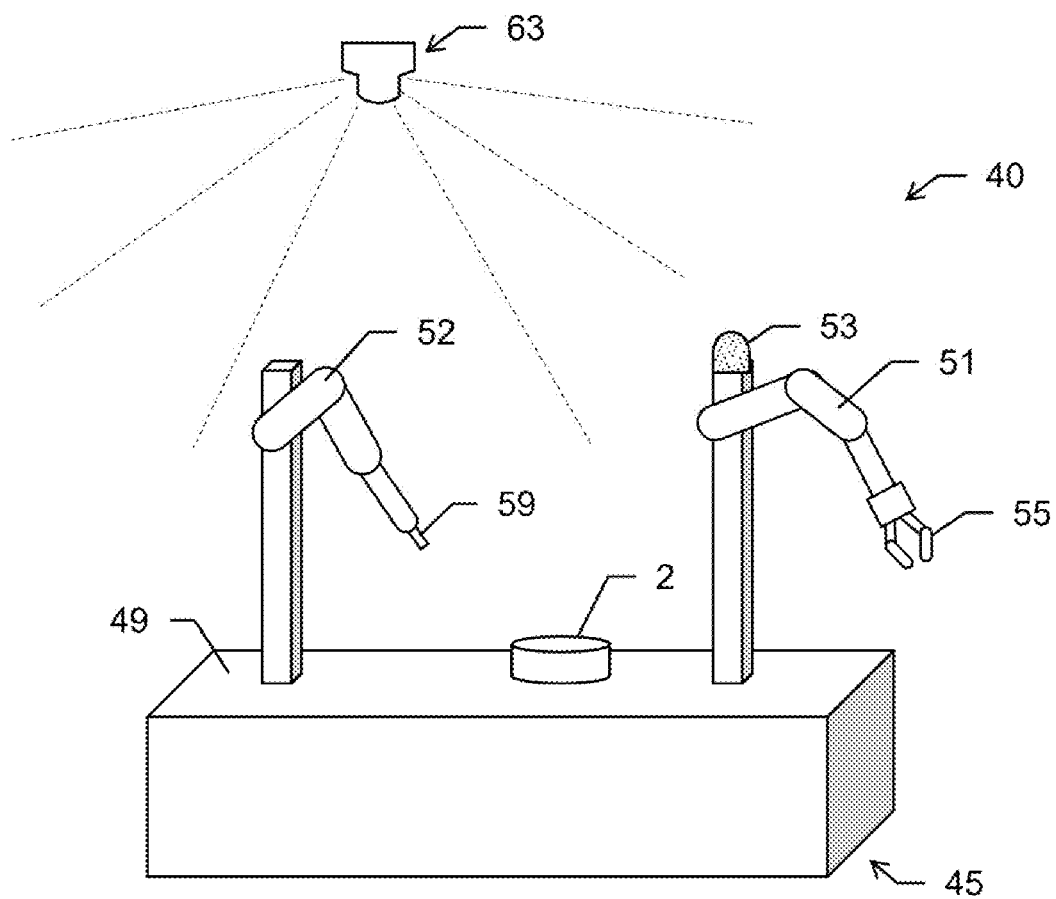
FIG. 6 shows a fourth exemplary embodiment of a system comprising a combined measuring and pick-up robot with an integrated measurement table.

FIG. 6 shows a fourth exemplary embodiment of a system for autonomously measuring workpieces. In contrast to the first, second and third embodiments, the system comprises only one mobile robot 45. This robot 45 comprises the functions of, both, the pick-up robot and the measuring robot of FIG. 5.

The pick-up and measuring robot 45 is configured for collecting a workpiece 2 at a production facility (not shown here) and to position it on the integrated measurement table 49. For this task, robot 45 comprises a first arm 51, for instance embodied as an articulated arm, with a grabbing tool 55, e.g. comprising a gripper, claw, artificial hand, or magnet, configured for collecting, holding and controlled release of the workpiece 2. The robot 45 also comprises a sensor setup, e.g. comprising a camera, for identifying the workpiece 2 and its exact position in order to collect it at the production facility.

The pick-up and measuring robot 45 is also configured for measuring the workpiece 2 at the integrated measurement table 49. For this task, robot 45 comprises a measuring arm 52, for instance embodied as an articulated arm, with a probe 59, e.g. a touch trigger or optical scanning probe, for determining 3D coordinates of the workpiece 2 while it lies on the surface of the measurement table 49. The measurement table 49 particularly is embodied as a granite measurement table with a granite surface.

The pick-up and measuring robot 45 comprises a positioning module 53 that allows determining its position in the production environment continuously and in real time, e.g. in collaboration or communication with a grid of position scanners 63 provided in the production environment.

The pick-up and measuring robot 45 comprises an autonomous navigation and propulsion unit for providing mobility of the mobile robot in the production environment. In the shown embodiment, robot 45 comprises wheels in connection with the propulsion unit for providing mobility. A communication interface of the robot 45 (not shown here) provides a data link other mobile robots and/or to a fog or cloud computation and storage system configured for cloud analytics.

Whereas a precision of the operation arm 51 need only be in the range of millimetres, the measuring arm 52 has to be precise enough to measure the workpiece 2 on the table 49 with the required accuracy. Optionally, the measuring robot can have additional feet that may be extractable before each measurement to provide a more stable position while performing the measurement.

In another embodiment, the pick-up and measuring robot 45 only comprises a single arm for transporting and measuring the workpiece 2. This combined arm comprises one or more grabbing tools 55 as well as one or more probes 59 that are automatically interchangeable (e.g. retractable or revolvable) for changing from a transport mode to a measuring mode. This robot may comprise the measurement table 49. In this case, a suitable grabbing tool 55 of the single arm is used for collecting the workpiece 2 and positioning it on the table. Subsequently, the grabbing tool 55 is exchanged for a suitable probe 59 for measuring the workpiece 2. Afterwards, the probe 59 is exchanged for the grabbing tool again 55 to remove the workpiece 2 from the table 49, e.g. returning it to the production facility. If the pick-up and measuring robot does not comprise a measurement table 49, the robot additionally needs to travel to a fixedly installed measurement table (as shown in FIGS. 2-4) or to an independently mobile measurement table (not shown here).

Figure 7:
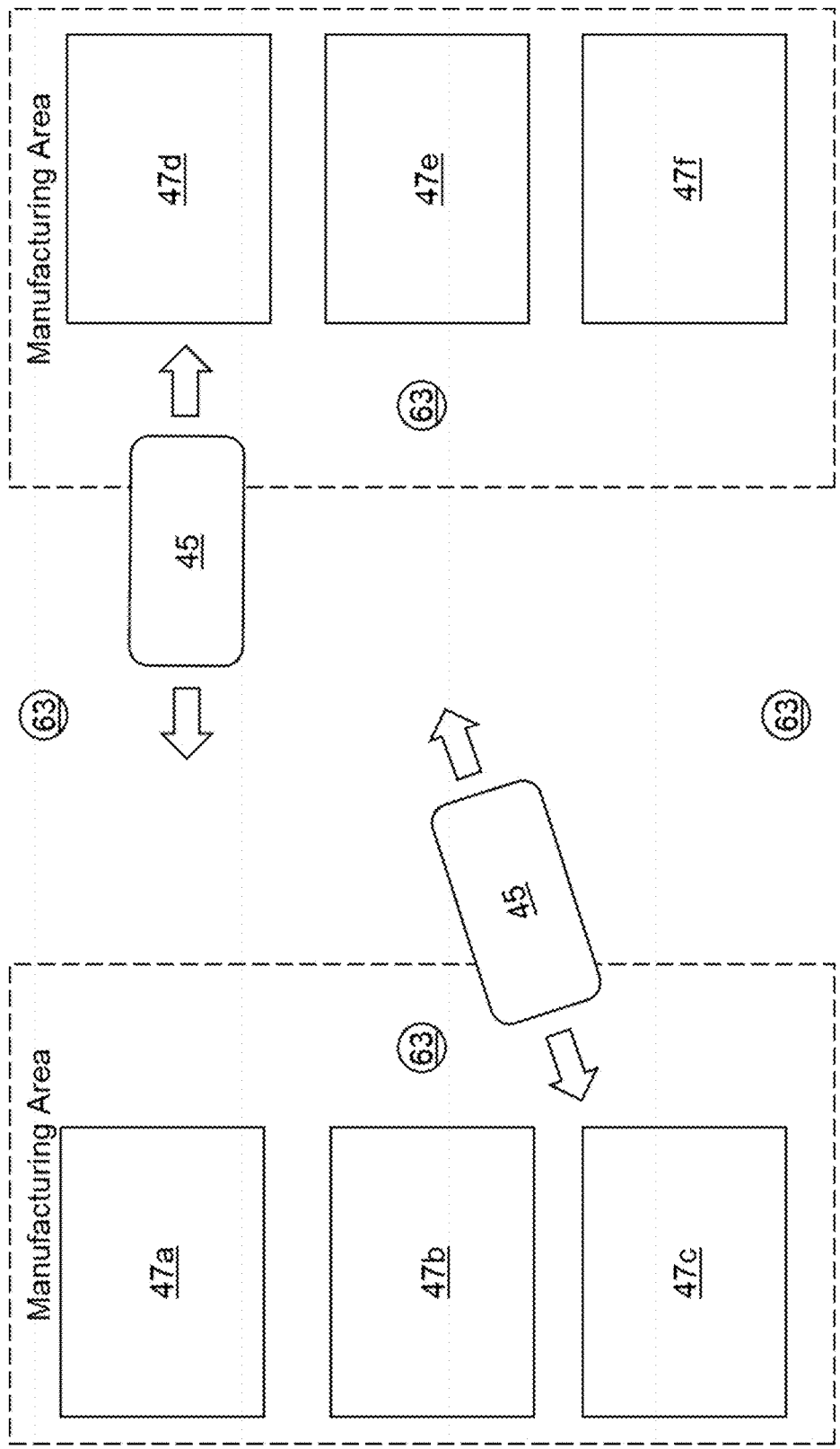
FIG. 7 shows a production environment comprising the fourth embodiment of a system.

FIG. 7 illustrates the use of the system according to the fourth embodiment in a production environment.

In contrast to the embodiment of FIG. 4, the production environment does not comprise a dedicated measuring area since a measurement table is integrated in each mobile robot 45. The production environment comprises two manufacturing areas, each comprising three production facilities 47a, 47b, 47c, 47d, 47e, 47f, i.e. six machines producing different kinds of workpieces.

The system comprises two pick-up and measuring robots 45 that move around the production environment and are configured to approach the production facilities 47a-f, to identify and collect a certain workpiece from the respective facility, to position it on the integrated measurement table and to measure the workpiece once it is positioned on the measurement table.

A 3D surveillance system comprising a grid of position scanners 63 is provided in the production environment, e.g. mounted under a ceiling of the factory.

Alternatively, in an embodiment without integrated measurement tables (not shown here), the mobile robots may be configured to identify a workpiece in the production facility 47a-f and measure it directly in the facility, e.g. directly as it has been found or after re-positioning it before the measurement.

Figure 8:
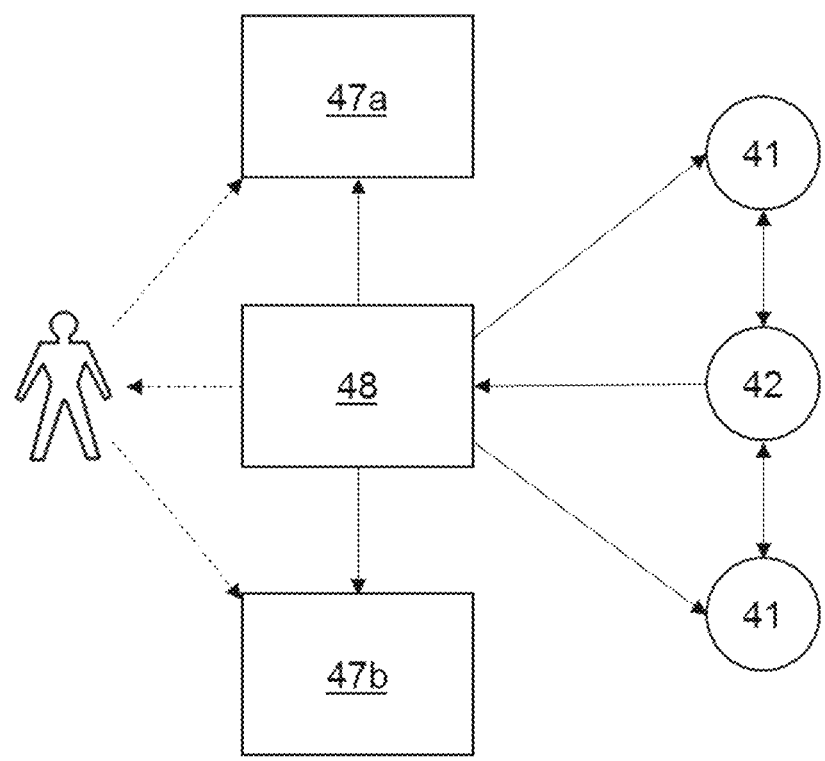
FIG. 8 illustrates a data flow in an exemplary embodiment of a system.

FIG. 8 illustrates the flow of data in an exemplary embodiment of the system. The system comprises two pick-up robots 41, one measuring robot 42 and a computation and storage system 48 that optionally may be configured as a fog or cloud computation and storage system and/or configured for cloud analytics.

Each robot 41, 42 comprises a wireless communication interface providing a data link to at least one other mobile robot and/or to the computation and storage system 48. The computation and storage system 48 preferably is connected by means of a data link to the production facilities 47a, 47b which enables the computation and storage system 48 to automatically control the production facilities 47a, 47b. Alternatively or additionally, the computation and storage system 48 has a user interface to provide information to a human operator who controls the production facilities 47a, 47b.

The computation and storage system 48 generates task data for the pick-up robots 41 and provides the task data to the pick-up robots 41, which, based thereon, perform the task of subsequently approaching several production facilities 47a, 47b to collect certain workpieces for measurement by the measuring robot 42. The task data may be generated and provided continuously and in real time, e.g. based on feedback from the production facilities 47a, 47b, on measurement data received from the measuring robot 42 and/or on cloud analytics. Alternatively, the task data may be generated and uploaded to the pick-up robots 41 as a block at the beginning of a measurement cycle or shift.

The measuring robot 42 generates measurement data from measurements of workpieces and provides the measurement data to the computation and storage system 48, preferably in real time directly after each measurement. The measurement data from one or more workpieces may be used by the computation and storage system 48 to control the production facilities 47a, 47b and/or to adapt the task data that is provided to the pick-up robots 41.

Also the pick-up robots 41 and the measuring robot 42 communicate with each other, for instance regarding workpieces that have been positioned or are about to be positioned on a measurement table, and regarding workpieces that have been measured and can be collected from the measurement table and either be returned to the respective production facility 47a, 47b or to a designated storage area. Although in FIG. 8 there are arrows directly between the pick-up robots 41 and the measuring robot 42, these do not necessarily have to communicate directly with each other. Alternatively or additionally, the communication may be indirectly, e.g. via the computation and storage system 48. For instance, the measuring robot 42 sends the information that a workpiece has been measured to the computation and storage system 48, e.g. together with the measurement data, and the computation and storage system 48 sends a task to collect the workpiece from the respective measurement table to one of the pick-up robots 41, e.g. simply to the one waiting at the table or, if no robot is waiting, to the nearest one available, or in an optimized way, e.g. to the one robot for which collecting and returning the workpiece would constitute the shortest detour.

If the pick-up and measuring functionalities are combined in a single robot, said communication between pick-up robots 41 and measuring robot 42 is not necessary. Such a pick-up and measuring robot (see FIGS. 6 and 7) is then configured to receive the task data from the computation and storage system 48 and provide the measurement data to the computation and storage system 48.

The task data that is generated a the computation and storage system and provided to the one or more autonomous mobile pick-up robots 41, comprises computer-readable instructions regarding a task for each of the mobile pick-up robots to subsequently approach the plurality of production facilities 47a-b, to collect a workpiece at each production facility and to position it on a measurement table within the production environment. The workpiece is then measured at the measurement table by means of the one or more autonomous mobile measuring robots 42 to generate measurement data, which is then provided to the computation and storage system 48. The measurement data of one or more measured workpieces may be used by the computation and storage system to control the production facilities, and to generate adapted task data comprising computer-readable instructions regarding an adapted task for one or more of the mobile pick-up robots.

Controlling the production facilities 47a-b may comprise stopping production, e.g. if the measurement data of a workpiece exceeds a predefined threshold. A plurality of subsequent measurements of the same kind of workpiece may be used to determine a trend. This trend e.g. reveal that a production quality in a certain facility decreases. Then, controlling said production facility may comprise automatically adapting the production. This adaptation may comprise initiating maintenance of the production facility, e.g. including repair or replacement of a tool of the facility. Additionally or alternatively (as disclosed in EP 3 045 992 A1), the adaptation may comprise generating an adapted production model for producing the workpiece in the facility in such a way that errors are compensated. Also, based on a determined trend, the task data can be adapted in such a way that workpieces from such facilities are measured more often than others in order to monitor the trends.

Figure 9:
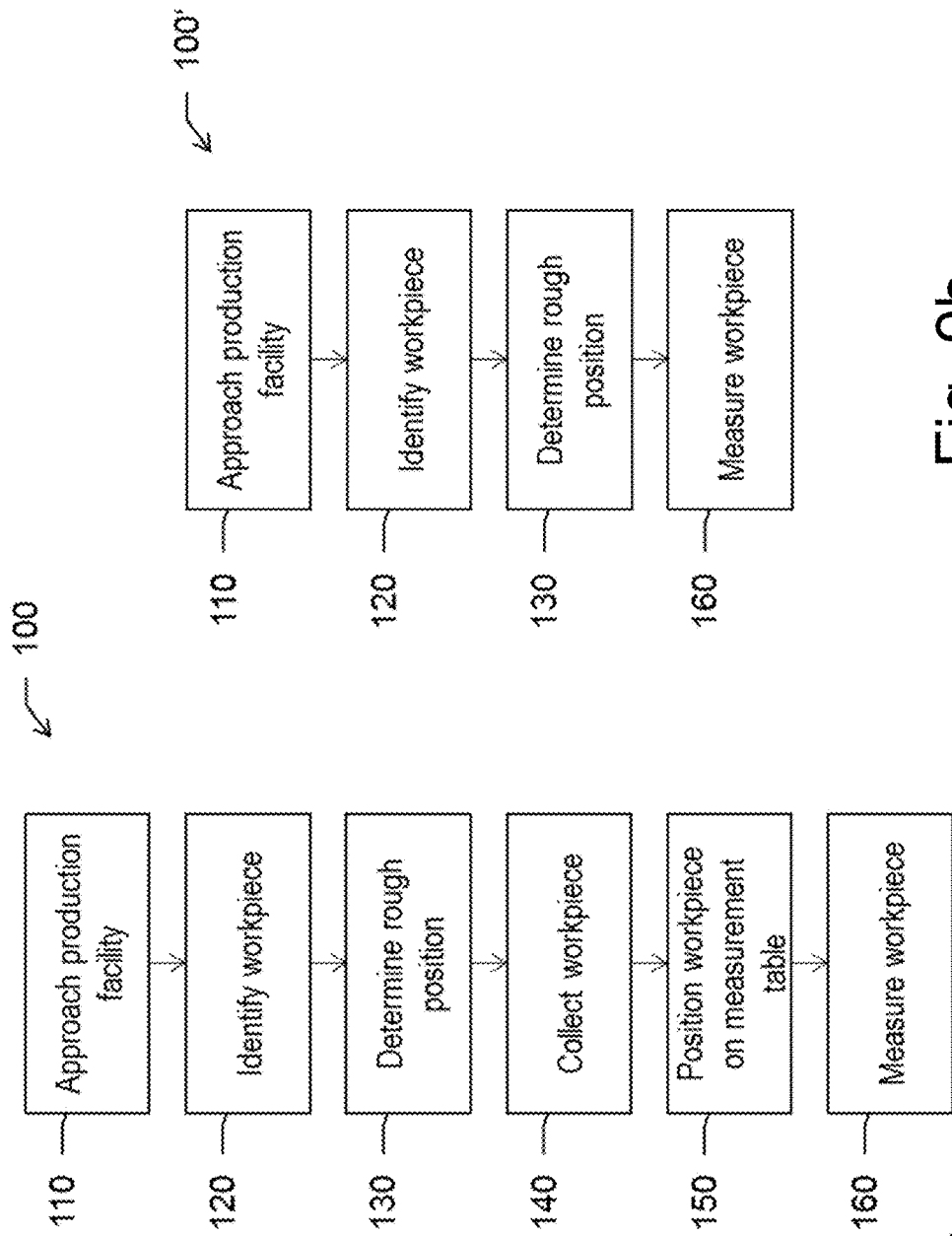
FIGS. 9a,b show two flow charts illustrating two exemplary work flows for a system.

FIGS. 9a and 9b show two flow charts illustrating two exemplary workflows of the pick-up and measuring robot(s) of a system.

FIG. 9a illustrates a first exemplary workflow 100. In a first step 110, a pick-up robot approaches a production facility. Next, the pick-up robot identifies 120 a workpiece to be measured and determines 130 its position. This position may be a rough position, i.e. need not be determined with high accuracy. The accuracy of the determined position needs only be accurate enough for collecting 140 the workpiece with a grabbing tool of the pick-up robot without damaging or losing the workpiece. The collected workpiece is then positioned 150 on a measurement table. If this measurement table is integrated into the pick-up robot, the robot does not need to move, otherwise this step includes transporting the workpiece to the measurement table. Positioning 150 the workpiece may include moving the workpiece to a predetermined position on the measurement table and/or the re-arranging the workpiece on the measurement table to move it into a predetermined measuring pose. The workpiece is then measured 160 by a measuring robot, which optionally can be the same robot as the pick-up robot (pick-up and measuring robot). Optionally, after a partial measurement of the workpiece, the workpiece may be re-arranged on the measurement table (e.g. by the pick-up robot) to change the pose to allow continuing the measurement.

FIG. 9b illustrates an alternative workflow 100'. In a first step 110, a measuring robot approaches a production facility. Next, the measuring robot identifies 120 a workpiece to be measured and determines 130 its position. This position may be a rough position, i.e. need not be determined with high accuracy. The accuracy of the determined position needs only be accurate enough for subsequent measuring 160 of the workpiece directly in the production facility. Optionally, the measuring 160 may include re-arranging the workpiece, either before the measurement or after a partial measurement of the workpiece, to change the pose of the workpiece to allow beginning or continuing the measurement. For this re-arranging the measuring robot may be equipped with a grabbing tool either provided on a separate arm or on a measuring arm that also comprises the probe for measuring the workpiece.

Figure 10:
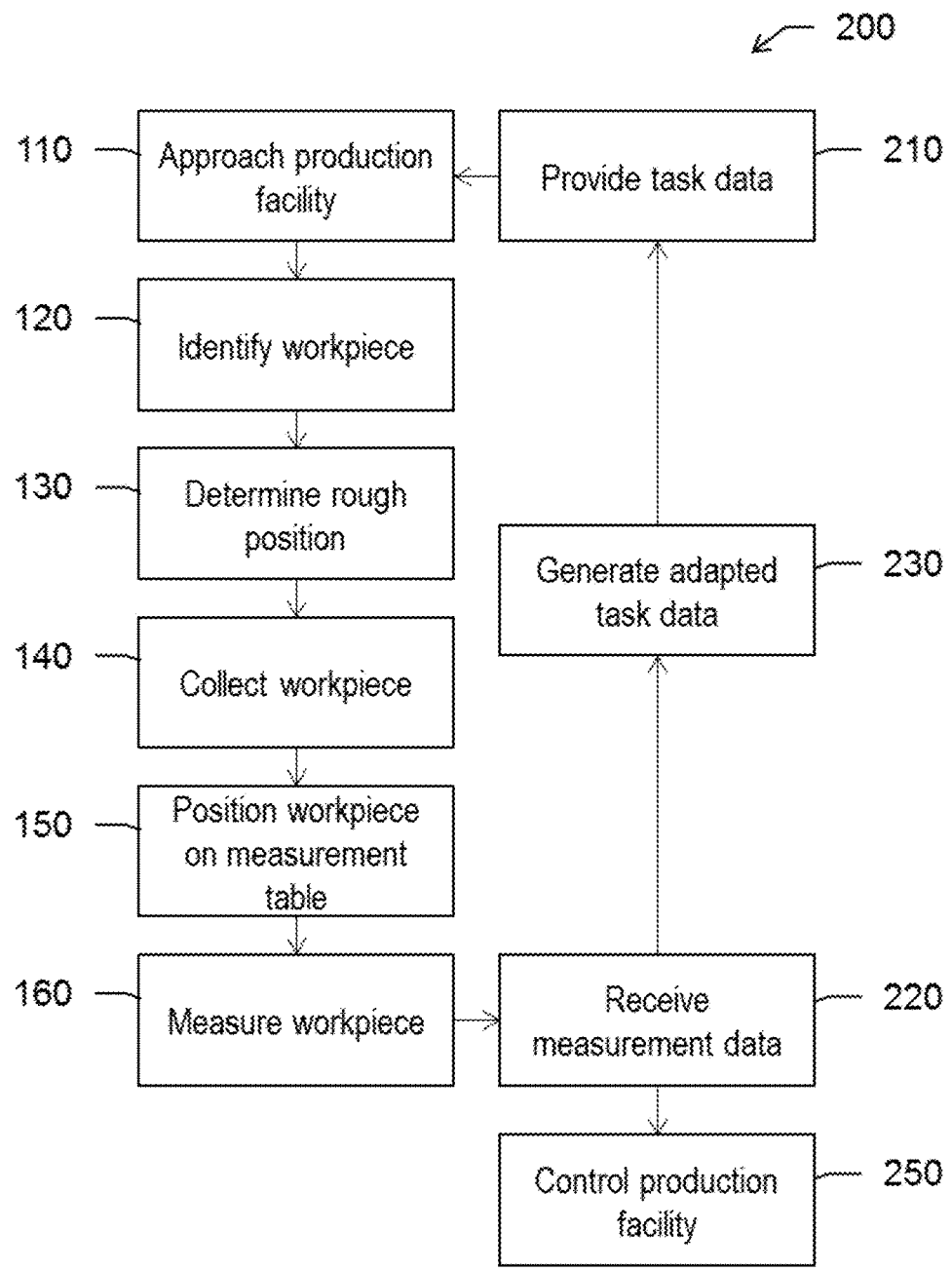
FIG. 10 shows a flow chart illustrating an exemplary embodiment of a method.

FIG. 10 shows a flow chart illustrating an exemplary embodiment of a method. It can be performed by a system described above with respect to FIGS. 2 to 8. In the shown embodiment, the method 200 comprises the steps of the workflow of FIG. 9a, which are arranged on the left side of the flow chart. The steps on the right side are performed by a computation and storage system. The method 200 allows controlling a measurement of a plurality of different workpieces produced in a plurality of production facilities in a production environment. The method 200 comprises generating task data at the computation and storage system and providing 210 this task data to one or more autonomous mobile pick-up robots. The task data comprises computer-readable instructions regarding a task for each of the mobile pick-up robots. The task may comprise a workflow as described with respect to FIG. 9a or 9b. In this example, it comprises subsequently approaching 110 the plurality of production facilities, to identify 120 a workpiece at each production facility, determine 130 its position, collect 140 the workpiece and position 150 it on a measurement table within the production environment.

After a workpiece has been measured by an autonomous mobile measuring robot, the computation and storage system receives 220 measurement data of this workpiece from the measuring robot. Measurement data from one or more workpieces can then be used by the computation and storage system to generate 230 adapted task data comprising computer-readable instructions regarding an adapted task for one or more of the mobile pick-up robots, this adapted task data is then provided 110 again to the pick-up robots. Also, this measurement data can be used to control 250 one or more of the production facilities—automatically by the computation and storage system or by informing a human operator. Alternatively, one of the autonomous robots may receive a task to approach the facility and operate it via a user interface of the facility, e.g. to turn the facility off by pushing an emergency stop button with its end effector.

Controlling 250 the production facilities may comprise stopping production in order to prevent continued production of sub-standard or faulty workpieces. For instance, if measurement data of a single workpiece from a facility exceeds a predefined threshold, this facility may be shut down. A plurality of subsequent measurements of the same kind of workpiece may be stored in the memory of the computation and storage system and used to determine a trend. If this trend reveals that a production quality in a certain facility decreases over time or fluctuates, controlling 250 said production facility may comprise automatically adapting the production or informing a human operator who then may determine the reason. Also, based on a determined trend, the task data can be adapted 230 in such a way that workpieces from such facilities are measured more often than others in order to monitor such trends.

Although aspects are illustrated above, partly with reference to some preferred embodiments, it must be understood that numerous modifications and combinations of different features of the embodiments can be made. All of these modifications lie within the scope of the appended claims. For instance, each of the embodiments described with respect to FIGS. 2, 3, 5 and 6 may be part of a system according to FIG. 1, or features of the system of FIG. 1 may be part of the embodiments of FIGS. 2, 3, 5 and 6. Specifically, all or some of the mobile robots 41, 42, 44 or 45 may be embodied as mobile vehicles 5 of the system of FIG. 1.

The invention claimed is:

1. A system for autonomously measuring workpieces, the system comprising a computation and storage system and one or more mobile robots, the one or more mobile robots being configured to move autonomously in a production environment comprising a plurality of production facilities producing a plurality of different workpieces, each of the mobile robots comprising
 a spatial localization system for deriving a location of the mobile robot in the production environment,
 an autonomous navigation and propulsion unit configured for providing mobility of the mobile robot in the production environment, and
 a wireless communication interface providing a data link to at least one other mobile robot and/or to the computation and storage system,
 wherein a first mobile robot comprises one or more sensors, and the computation and storage system is configured to provide task data to the first mobile robot, wherein the task data comprises at least:
 identification information for a plurality of different workpieces, the identification information allowing the first mobile robot to identify the workpieces using at least one of its sensors; and
 pose information for a plurality of different workpieces, the pose information being related to a required pose of the workpiece for being measured,
 wherein the first mobile robot is configured to receive the task data and to use at least one of its sensors for identifying, at each of at least a subset of the production facilities, a workpiece to be measured and for determining an at least rough position of the workpiece that allows collecting and/or measuring the workpiece, wherein the first mobile robot or a second mobile robot comprises:
 a measuring arm with a probe for measuring the workpiece and obtaining measurement data about the measured workpiece, and
 a first wireless communication interface configured for providing the obtained measurement data to the computation and storage system, wherein:
 the first mobile robot comprises an end effector configured for collecting, holding and controlled release of the workpiece;
 the first mobile robot is configured to collect the identified workpiece, to transport the workpiece to a measurement table and to position the workpiece on the measurement table;
 the first mobile robot or the second mobile robot is configured for measuring the workpiece on the measurement table using the probe; and
 the first mobile robot is configured, after the workpiece has been measured partially, to move the workpiece on the measurement table to change a pose of the workpiece based on the pose information.

2. The system according to claim 1, wherein the computation and storage system is configured
 as a fog or cloud computation and storage system,
 for performing cloud analytics, and/or
 to control at least a subset of the production facilities.

3. The system according to claim 1, wherein the task data further comprises at least one of
 sequence information about a sequence for subsequently approaching the plurality of production facilities by the first mobile robot; and
 position information about a position of the production facilities and/or a path of the first mobile robot to the next production facility in the sequence.

4. The system according to claim 1, comprising a plurality of first mobile robots and at least one second mobile robot, wherein, for allowing movement of the mobile robots in the production environment, a first subset of the mobile robots comprises wheels and a second subset of the mobile robots comprises legs, wherein each subset comprises at least one first mobile robot.

5. The system according to claim 1, comprising at least one first mobile robot and at least one second mobile robot, wherein
 the second mobile robot comprises the measuring arm; and
 the first mobile robot and the second mobile robot each comprise either the first wireless communication interface or a second wireless communication interface, wherein the first wireless communication interface and the second wireless communication interface are configured to provide a data link for exchanging, directly and/or via the computation and storage system, data with each other,
 the second mobile robot comprises the first wireless communication interface;
 the first mobile robot is configured to send data to the second mobile robot comprising information about an identity of a collected workpiece and/or about a position of a workpiece to be measured on the measurement table;
 the second mobile robot is configured to issue, after measuring the workpiece, a command to the first mobile robot to collect the workpiece from the measurement table, and/or
 the second mobile robot is configured to issue, based on a result of the measurement of the workpiece, a command to the first mobile robot to either transport the workpiece back to the production facility or to a defined storage area.

23

6. The system according to claim 5, wherein the second mobile robot comprises the measurement table.

7. The system according to claim 1, wherein the first mobile robot comprises the measuring arm and the first wireless communication interface.

8. The system according to claim 7, wherein the first mobile robot comprises the measurement table.

9. The system according to claim 1, wherein the measuring arm comprises an end effector configured for collecting, holding and controlled release of the workpiece, wherein the end effector and the probe are automatically interchangeable.

10. The system according to claim 9, wherein
the measuring arm is embodied as an articulated arm,
the end effector is embodied as a grabbing tool and/or comprises a gripper, a claw, an artificial hand, and/or a magnet, and
the probe is a touch trigger probe or an optical scanning probe.

11. The system according to claim 1, wherein the first mobile robot comprises an operation arm comprising the end effector, wherein
the operation arm is embodied as an articulated arm, and/or
the end effector is embodied as a grabbing tool and/or comprises a gripper, a claw, an artificial hand, and/or a magnet.

12. The system according to claim 1, wherein the first mobile robot is configured to collect the workpiece from the measurement table after the workpiece has been measured, and to transport the workpiece back to the production facility or to a defined storage area.

13. The system according to claim 1, wherein
the measuring arm is an articulated arm, and
the probe is a touch trigger probe or an optical scanning probe,
wherein the probe is automatically interchangeable.

14. A computer-implemented method for controlling a measurement of a plurality of different workpieces produced in a plurality of production facilities in a production environment, the method comprising:
generating task data at a computation and storage system, the task data comprising computer-readable instructions regarding a task for one or more mobile robots to subsequently approach the plurality of production facilities, to collect a workpiece at each production facility and to position the workpiece on a measurement table within the production environment, wherein the task data comprises at least:
identification information for a plurality of different workpieces, the
identification information allowing the identifying of the workpieces with one or more sensors of the respective mobile robot; and
pose information for a plurality of different workpieces, the pose information being related to a required pose of the workpiece for being measured;
providing the task data to at least a first mobile robot, the first mobile robot comprising a first arm and a second arm, the first arm being an operation arm comprising an end effector configured for collecting, holding and controlled release of a workpiece, the second arm being a measuring arm with a probe for measuring the workpiece:
the first mobile robot identifying a first workpiece using the identification information;

24 the first mobile robot using the end effector of the first arm to collect the first workpiece, to transport the first workpiece to a measurement table and to position the first workpiece on the measurement table;
the first mobile robot measuring the first workpiece on the measurement table using the probe of the second arm and obtaining measurement data about the first workpiece;
the first mobile robot providing the measurement data to the computation and storage system; and
using the measurement data of at least the first workpiece to control one or more of the production facilities by the computation and storage system, and to generate adapted task data comprising computer-readable instructions regarding an adapted task for one or more of the mobile robots.

15. A computer program product comprising program code which is stored on a non-transitory machine-readable medium, for performing, when executed on a computation and storage system, the method according to claim 14.

16. The system according to claim 3, wherein the computation and storage system is configured to receive the measurement data and to use the measurement data of one or more measured workpieces to
control one or more of the production facilities by the computation and storage system, and/or
generate adapted task data comprising computer-readable instructions regarding an adapted task for one or more of the first mobile robots, and to provide the adapted task data to at least the first mobile robot continuously and in real time.

17. The system according to claim 1, wherein one of the first mobile robot and the second mobile robot comprises the measurement table, wherein the measurement table is a granite measurement table comprising a granite surface to position the workpiece on.

18. The system according to claim 1, wherein at least one of the sensors of the first mobile robot is a camera.

19. A system for autonomously measuring workpieces, the system comprising one or more mobile robots configured to move autonomously in a production environment comprising a plurality of production facilities producing a plurality of different workpieces, each of the mobile robots comprising
a spatial localization system for deriving a location of the mobile robot in the production environment,
an autonomous navigation and propulsion unit configured for providing mobility of the mobile robot in the production environment,
a wireless communication interface providing a data link to at least one other mobile robot and/or to a computation and storage system,
wherein a first mobile robot comprises a sensor setup comprising one or more sensors and is configured to use one or more of the sensors for identifying, at each of at least a subset of the production facilities, a workpiece to be measured and for determining an at least rough position of the workpiece that allows collecting and/or measuring the workpiece, wherein the first mobile robot comprises:
an operation arm comprising an end effector configured for collecting, holding and controlled release of the workpiece,
a measuring arm with a probe for measuring the workpiece and obtaining measurement data about the measured workpiece, wherein the operation arm is not the measuring arm, and a first wireless communication interface configured for providing the obtained measurement data to the computation and storage system, wherein the first mobile robot is configured to use the end effector to collect the identified workpiece, to transport the workpiece to a measurement table, and to position the workpiece on the measurement table, and configured to use the probe to measure the workpiece on the measurement table.

20. The system according to claim 19, wherein at least one of the operation arm and the measuring arm is embodied as an articulated arm.

21. The system according to claim 19, wherein the probe is a touch trigger probe or an optical scanning probe, and the end effector comprises at least one a gripper, a claw, an artificial hand, and a magnet.

* * * * *